3,826,764
FOAMED FIRE RESISTANT SELF EXTINGUISHING COMPOSITIONS CONTAINING A FLAME EXTINGUISHING MATERIAL RELEASING FLAME EXTINGUISHING GASES SUCH AS $CO_2$ OR $N_2$ WHEN SUBJECTED TO HIGH TEMPERATURES AND METHOD OF MAKING

Wilhelm G. Weber, 20 Genrenackerstrasse, 4133 Pratteln, Switzerland
No Drawing. Filed Dec. 13, 1972, Ser. No. 314,590
Claims priority, application Switzerland, Dec. 18, 1971, 18,597/71
Int. Cl. C08g 22/44, 51/56; C09k 3/28
U.S. Cl. 260—2.5 AJ          1 Claim

ABSTRACT OF THE DISCLOSURE

A method of preparing a semi-rigid light-weight foamed fire-resistant packaging and shock-absorbing construction material which is capable of evolving large volumes of fire extinguishing gases through the pores thereof when heated at high temperature in which a liquid polyether polyol, amine catalyst and surface active agents are mixed heated at high temperature in which a liquid polyether blowing agent e.g. cold liquid trichlortrifluoromethane which expands the polyurethane formed by polyolisocyanate reaction so that an open cell foam is developed when it is poured. The in situ polyurethane open cell foam before pouring is mixed therewith a flame extinguishing material which releases $N_2$ or $CO_2$ flame extinguishing gas when the foamed plastic is subjected to high temperature, and the flame extinguishing material may be used with an activating lead compound or an activating zinc compound, examples such as azo dicarbonamide, sodium bicarbonate, sodium sesquicarbonate, barium azo dicarboxylate or 4,4[1] bis (benzene sulfonyl-carbazide) which in the presence of activating lead compounds or zinc stabilizers serve to release copious quantities of flame extinguishing gases ($CO_2$ or $N_2$) at temperatures above 125° C., generally 160–180° C. Fillers such as chlorinated paraffin and antimony oxide are added to impart flame resistance.

---

The present invention refers to porous substances, in particular to foamed plastic substances which are useful in packaging applications, construction of buildings, warehouses, vehicles etc.

It is a problem, when a fire starts, to prevent the spread of the fire and its enlargement to catastrophic size, until detection of the initial source of the fire and the start of effective fire fighting measures. In warehouses, containing a large quantity of packaged goods, even an initially small fire finds more than sufficient combustible material to grow rapidly, so that a spontaneous and rapid spread of the fire may occur. Damage to property can be very large and even if counter-measures are starting promptly, they are generally confined to attempts to preserve the building structure and to protect other structures in the neighbourhood.

It has been found now, that precisely for the last cited case an extremely efficient measure may be used to prevent the spread of fire and to extinguish or reduce the fire itself with these measures being effective even at a distance. Naturally this should not exclude use of all other well known fire fighting measures in a warehouse, like for example sprinkler systems etc.

An object of the invention is to provide a fire resistant packaging means composed shock-absorbent, foamed plastic materials, having valuable properties for packaging, and provided during their manufacture, in addition to the well known additives to make them flame-retardant and/or self-extinguishing with at least one additional filler, which is capable to release large quantities of non-toxic flame extinguishing gas, if a preselected temperature limit is surpassed.

According to a first method for manufacturing the fire resistant material, one uses during the manufacture besides a well known practice of adding a foaming-agent used to create the foamed and porous structure, a further addition of a secondary flame-extinguishing agent to remain latent in the manufactured packaging material until a preselected temperature limit is surpassed under conflagration conditions when the secondary agent capable of generating non-toxic flame extinguishing gas will start to react. According to another method for manufacturing the fire resistant material, a secondary flame extinguishing agent is used, which is encapsulated in capsules, which react and release the flame-extinguishing gases once a preselected temperature is surpassed, the capsules may be used as such, or preferably in form of microcapsules as filler in a foamed material.

The additional flame-extinguishing filler material for the invention may be preferably selected from well known materials which develop non-toxic fumes or gases once a known reaction starting temperature is surpassed. This means that even large quantities of the developed gas should have no toxic or harmful effect on humans. The volumes of gas developed for each gram of filler could be for example 100 to 300 milliliters, thereby effectively able to prevent fire spreading in closed space. Known process for the manufacture of foamed materials using single- or multiple-step methods, often make use of substances which can be decomposed thermally or by catalytic effects, and which result in a foamed structure in the final material having open and closed pores. According to the invention it is possible to add a further portion of similar substances as filler durng the manufacturing process of the porous material. The temperature of reaction for this secondary filling substance is then selected to be higher than the maximum temperature which occurs during the manufacturing process. The main advantages of structural rigidity and low denstiy will remain with the final product. The secondary filler remains latent in the material, its decomposition and the development of fire extinguishing gas in larger volume only occurs, if during a fire the characteristic decomposition temperature is surpassed. Then the gas escapes through the open porous structure of the material, whereas the remaining products of decomposition remain as salts in the material.

One preferred field of application of the fire-resistant porous materials, manufactured according to the invention, is the application in lightweight construction and for packaging. The porous material for this purpose can be foamed with concrete aggregate, or in a concrete mix containing an organic binder, or foamed plastics. Among the binders which can be used in this manner there are known several which are inflammable only with difficulty or are non-inflammable. Other plastics are known to be compoundable with additions to give them flame retardant or self-extinguishing properties, and to these plastic-concrete mixtures a secondary flame-extinguishing filler may be added according to the invention.

As secondary fillers according to the invention, one may use solid or liquid substances, which have already proven their value as means for fire fighting. Amongst these there are for example substance which evolve carbon dioxide or compounds which upon decomposition by heat develop nitrogen or other flame extinguishing gases. The temperature, when decomposition starts and gas is evolved or liberated can be preselected over a range of temperatures, by incorporating in a well known manner certain additives in the substances to modify the starting point of the reaction. Also advantageous are especially many of the foaming agents in use for the manufacture of foamed plastics—amongst them there are several which exhibit properties desirable for a secondary addition during manufacture to obtain material according to the invention. Many of them are known to be able to develop non-toxic and flame-extinguisihng gases in larger quantity. If the processing steps during manufacture are selected appropriately, the secondary additions remain dormant in the final material until a preselected temperature is surpassed in case of fire, the preselection is made by using appropriate additives with the secondary agent.

A further variant of method to manufacture materials with properties according to the invention is to incorporate under higher pressure substances in the materials which will release carbon dioxide when the finished material expands provoked by the heat of a fire. Preferably the carbon dioxide is encapsulated under pressure and the capsules are used as filler in foamed materials. Naturally a further method would be to impregnate the structure of a porous material with a liquid secondary filler and then to seal the surface.

Example 1

By way of example, the following describes the manufacture of a foamed compound, which contains additional means to make the foamed product on the one hand difficult to ignite and furthermore to make the final product release considerable volumes of non toxic and flame extinguishing gas, once a predetermined temperature is surpassed. The foamed plastic selected for this example is a semirigid foamed polyurethane and could be produced in well known manner with existing equipment, which also is known in many alternatives able to foam insulation layers between construction elements in situ.

A polyurethane foam is produced from the following components: (all parts by weight)

660 parts of a polyether
145 parts of a catalyst, based on an amine
15 parts of a secondary catalyst, equally an amine and
130 parts of a surface-active medium to optimise the reaction.

Using these parts one forms a reaction mix incorporating also approximately 260 parts of a chlorinated hydrocarbon plus further 70 parts of antimony oxide, so that the resultant polyurethane-foam has flame-retardant and self-extinguishing properties.

This premix is now thoroughly mixed with the catalysts and the surface active agents. Simultaneously or only briefly afterwards, a further 420 parts of a azodicarbonamide are added to the mix, for the later the temperature of activation has been adjusted by smaller additions of lead- or zinc-stabilizers. Immediately afterwards, one adds about 165 parts of cold liquid trichlorofloromethane and 660 parts of toluoldiisocyanate and expells the mix through a mixing head onto an endless belt or into forms. The foam develops to its final state within 24 hours and contains dormant within its weight of 37 kg. per cubic meter approximately 7 kg. of a medium able to develop flame suffocating nitrogen in volumes as already indicated.

It may be mentioned here also that by trimerising the cross-linked polyurethanes one can also obtain a product which does not assist combustion by flame but instead will show only carbonisation under heat.

Example 2

The same formula as in example 1 is used with the substitution of the azodicarbonamide by a sodiumbicarbonate or a mix with sodiumsesquicarbonate. Both have the advantage of an economic price, endothermic decomposition reaction under the heat of fire and can release larger volumes of $CO_2$ and/or water vapour. Decomposition of the sodiumbicarbonate within the semi rigid foam matrix starts at about 125° C. and goes to completion at 160–180° C.

Example 3

85 parts by weight of toluol diisocyanate
200 parts of ether of polypropylenglycol (with molecular weight near 4100)

are actived with 10 parts compounded of triethyldiamine+polyether siloxane+water
6 parts of stannic dioctoate+polyether and 100 parts of azodicarbonamide are mixed and spread under the hood and the flooring of a passenger car and is promoted and allowed sufficient time to foam-up to an average thickness of about 1⅛ inch. A fire started by frontal or sidewise collision due to the rupture of fuel lines with the motor running will be suffocated by the non-toxic gases produced by the decomposition of the azodicarbonamide within a very short time (under a minute), sufficient to save passengers from mortal burning injuries. A possible impairment of foam shape and flexibility is accepted here because of minor importance.

Example 4

Using modern compounding equipment it is possible to produce pelletised or extruded polystyrene containing on the one hand low boiling foaming agents plus on the other hand inorganic carbonates or inorganic compounds as for example Bariumazo dicarboxylate or $4.4^1$ oxy bis (benzenesulfonyl-carbazide) or similar higher temperature decomposition compounds, to remain largely as non-activated fillers during a first-step expansion and second step sintering or tempering process aiming to produce light weight crates or boxes of foamed materials.

Use of such packaging material, which could also be of similar compounded plastics, martially reduces the danger of fire spread in modern automated warehouses and ships charged with packaged and palletised goods, because in the heat of a fire the container would release large quanities of non-toxic but flame suffocating gas preventing also ignition of the contained goods. And furthermore the softened foamed crate could be made to foam again closing the free spaces between the packages thus materially reducing the draft of the fire already suffocating under the escaping gas.

The same technique except the secondary foaming could also be applied to resins of the phenolic or amino-types expanded and thermo-set at low to medium temperatures.

What is claimed is:

1. A method of preparing a semi-rigid, light weight open-pore foamed flame retardant packaging and construction material which is capable of evolving large quantities of flame extinguishing $N_2$ gases through the pores of the material when subjected to high temperature consisting especially of:
   (a) mixing in liquid form a polyether polyol with one or more amine catalysts and surface active agents;
   (b) incorporating at room temperature into the mixture an aromatic polyisocyanate to react with the polyether polyol in the presence of said amine catalyst and surface active agent and form the polyurethane together with cold trichlorofluoromethane and with a flame-extinguishing material which decomposes at high temperatures encountered in conflagration to release $N_2$, said cold trichlorofluoromethane foaming the mixture of polyurethane and flame-extinguishing material so when the mixture is expelled through a mixing head it will develop into a foamed mass achieving its maximum and final expansion after 24 hours and will then contain the flame-extinguishing material which will decompose by heat at a temperature of 125°–180°, said flame-extinguishing material being selected from the group consisting of azo dicarbonamide, barium azo dicarboxylate and 4, 4¹ oxy bis (benzene sulfonyl carbazide);

(c) further incorporating as an additional fire retardant filler a mixture of chlorinated paraffin and antimony oxide; and, (d) expelling the mixture and developing the foam on a support for a period of 24 hours to form a mass which can be used for packaging after the material has developed its maximum foam for a period of 24 hours or can be used under the hood and flooring of a passenger car.

References Cited

UNITED STATES PATENTS

| | | | |
|---|---|---|---|
| 3,549,564 | 12/1970 | Parker | 260—2.5 AJ |
| 3,697,456 | 10/1972 | Pitts | 260—2.5 AK |
| 3,714,047 | 1/1973 | Marion | 260—2.5 AJ |

OTHER REFERENCES

"Blowing Agents," Encyclopedia of Polymer Science and Technology; Vol. 2; Wiley-Interscience; N.Y. 1965; pp. 539, 540, and 547 to 550.

DONALD E. CZAJA, Primary Examiner

C. WARREN IVY, Assistant Examiner

U.S. Cl. X.R.

106—15, 87; 117—132; 161—190, 213, 403; 252—5, 7; 260—2.5 AE, 2.5 AF, 2.5 AK, 2.5 AW, 2.5 B, 2.5 F